(12) United States Patent
December et al.

(10) Patent No.: US 10,113,085 B2
(45) Date of Patent: Oct. 30, 2018

(54) LOW TEMPERATURE CURE COATING FORMED VIA A DOUBLE LAYER CURING MECHANISM OF A PIGMENTED WATERBORNE BASELAYER AND A SOLVENTBORNE TOP LAYER

(71) Applicant: BASF Coatings GmbH, Muenster-Hiltrup (DE)

(72) Inventors: Timothy S. December, Rochester Hills, MI (US); Timothy Clark, Kingston (CA); Adam M. Ozvald, Kingston (CA)

(73) Assignee: BASF Coatings GmbH, Muenster-Hiltrup (DE)

( * ) Notice: Subject to any disclaimer, the term of this patent is extended or adjusted under 35 U.S.C. 154(b) by 274 days.

(21) Appl. No.: 15/220,081

(22) Filed: Jul. 26, 2016

(65) Prior Publication Data

US 2018/0030311 A1  Feb. 1, 2018

(51) Int. Cl.
| | |
|---|---|
| *C09D 187/00* | (2006.01) |
| *C09D 133/08* | (2006.01) |
| *C08K 5/3492* | (2006.01) |
| *C08K 7/18* | (2006.01) |
| *C08K 3/04* | (2006.01) |

(52) U.S. Cl.
CPC ....... *C09D 187/005* (2013.01); *C09D 133/08* (2013.01); *C08K 3/04* (2013.01); *C08K 5/34922* (2013.01); *C08K 7/18* (2013.01)

(58) Field of Classification Search
CPC .............. C09D 133/005; C09D 133/08; C08K 5/34922
See application file for complete search history.

(56) References Cited

U.S. PATENT DOCUMENTS

| | | | | |
|---|---|---|---|---|
| 5,326,815 | A * | 7/1994 | Serdiuk .............. | C08G 18/0823 524/539 |
| 5,578,345 | A | 11/1996 | Moy | |
| 5,578,346 | A * | 11/1996 | Moy ........................ | B05D 1/36 427/333 |
| 2003/0170397 | A1* | 9/2003 | Campbell .............. | B05D 7/536 427/407.1 |
| 2011/0014388 | A1 | 1/2011 | Brainard et al. | |
| 2014/0272419 | A1* | 9/2014 | Furar .................. | C09D 175/04 428/413 |
| 2016/0075907 | A1 | 3/2016 | Chasser et al. | |

FOREIGN PATENT DOCUMENTS

| | | |
|---|---|---|
| EP | 0 590 484 A1 | 4/1994 |
| WO | WO 02/085540 A1 | 10/2002 |
| WO | WO 2011/008271 A1 | 1/2011 |

OTHER PUBLICATIONS

International Search Report and Written Opinion dated Dec. 4, 2017 in PCT/EP2017/068289.

* cited by examiner

*Primary Examiner* — Robert D. Harlan
(74) *Attorney, Agent, or Firm* — Oblon, McClelland, Maier & Neustadt, L.L.P.

(57) ABSTRACT

Shelf-stable low temperature cure coating compositions that include a hydroxy-functional resin, a crosslinking agent, and a catalyst that does not catalyze the crosslinking reaction between hydroxy-functional resin and the crosslinking agent contained therein, but instead between a hydroxy-functional resin and a crosslinking agent contained in a different low temperature cure coating composition. In addition, low temperature cure composite coatings that include: a waterborne basecoat containing a first hydroxy-functional resin, a first crosslinking agent, a first catalyst, and an organic solvent; and a solventborne topcoat containing a second hydroxy-functional resin, a second crosslinking agent, a second catalyst, and water, where the first catalyst migrates into the topcoat from the basecoat and catalyzes the reaction between the second hydroxy-functional resin and crosslinking agent, and the second catalyst migrates into the basecoat from the topcoat and catalyzes the reaction between the first hydroxy-functional resin and crosslinking agent.

19 Claims, 6 Drawing Sheets

LOW TEMPERATURE CURE COATING FORMED VIA A DOUBLE LAYER CURING MECHANISM OF A PIGMENTED WATERBORNE BASELAYER AND A SOLVENTBORNE TOP LAYER

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF THE MATERIAL ON THE COMPACT DISC

Not applicable.

BACKGROUND OF THE INVENTION

Field of the Invention

The present invention relates to low temperature cure coating compositions, low temperature cure composite coatings that are formed by a double layer curing mechanism, and articles comprising the low temperature cure composite coatings. The low temperature cure coating compositions cure at temperatures from 80 to 120° C. in 20 minutes or less and thus, are suitable for heat sensitive or plastic substrates.

DESCRIPTION OF THE RELATED ART INCLUDING INFORMATION DISCLOSED UNDER 37 CFR 1.97 AND 1.98

In typical automotive coatings, four layers are applied to the metal surface of a vehicle: an e-coat, a primer, a basecoat, and a clearcoat. The e-coat and the primer layers are generally applied to the vehicle surface and cured. Subsequently, a basecoat formulation is applied with solvent, and the solvent is flashed off in a high temperature process. After properly conditioning the base coat, the clearcoat is applied next to provide the vehicle with a glossy finish and to protect against corrosion. Lastly, the coated vehicle surface is passed through an oven at temperatures in excess of 140° C. for 20 minutes, to cure the basecoat and clearcoat.

Although the conventional process is adequate and used commercially worldwide in the automotive industry, there is significant room for improvement. For one, any reduction in energy, materials, or the time required to make these coatings would result in large economic gains due to the large scale of use. In particular, it would be advantageous for vehicle manufacturers to reduce the number of high temperature steps as well as the process time. Additionally, it would be beneficial to reduce the temperature at which these steps are conducted.

At the same time, the automotive industry is being challenged to meet increasingly stringent Federal Corporate Average Fuel Economy (CAFE) standards for vehicle fleets. One key strategy to improve the overall fuel efficiency (mpg) of vehicles is to develop "light-weight" vehicles. A means for greatly reducing the weight of the automobile body is to replace heavier steel parts with lighter weight plastic parts. However, the use of light-weight plastics in the conventional process is an issue because many light-weight plastic substrate materials physically deform at curing temperatures greater than 130° C. Consequently, a reduction in the curing temperatures of the basecoat and the clearcoat would permit the use of plastic and other heat sensitive substrates necessary to reduce the weight of vehicle fleets.

Finally, it would be beneficial to employ at least one single-component system that is stable for an extended period of time without decomposing or prematurely curing as is typical for two-component systems in which one component contains a curable resin and the other component contains a crosslinking agent for the curable resin. Problems with two-component systems (i.e., separately packaged curable resins and crosslinking agents) include: inaccuracies arising from measuring and metering of precise amounts of each component by the preparer, which can lead to incomplete or too rapid of curing and result in undesirable film tackiness, cracking, and/or delamination; the need for costly metering equipment and metering aids to ensure the precise amounts of the separate components are mixed; under- or overmixing of the components; and the need for purge lines to avoid gelling of the individual components once they are mixed.

The objects of the present invention provided by low temperature solventborne and waterborne coating compositions that are curable at temperatures from 80 to 120° C. with cure times of 20 minutes or less. The low temperature coating compositions include a hydroxy-functional resin, a crosslinking agent, which may be blocked, and a catalyst. Notably, the catalyst included in the low temperature cure coating compositions does not catalyze the crosslinking reaction between hydroxy-functional resin and the crosslinking agent contained therein; instead, the catalyst is configured to catalyze a crosslinking reaction between a further hydroxy-functional resin and a further crosslinking agent that are contained in a neighboring low temperature cure coating composition. Generally, the low temperature cure compositions are applied to form a low temperature cure composite coating that includes a topcoat and a basecoat as follows:

(1) a waterborne bottom layer of a basecoat resin/crosslinking agent mixed with a catalyst for curing of the clearcoat; and (2) a solventborne top layer of a clearcoat resin/crosslinking agent mixed with a catalyst for curing of the basecoat.

Once these layers are placed on a material surface, they may be simultaneously cured with a single heating operation due to a mutual migration phenomenon in which the catalyst originally contained in waterborne bottom layer migrates into the solventborne top layer and affects the curing of the solventborne top layer while the catalyst originally contained in the solventborne top layer migrates into the waterborne bottom layer and affects the curing of the waterborne bottom layer.

BRIEF SUMMARY OF THE INVENTION

The low temperature cure coating compositions of the present invention are ideal for heat sensitive or plastic substrates because they cure at temperatures from 80 to 120° C.

The solventborne and the waterborne low temperature cure coating compositions each comprise a hydroxy-functional resin, a crosslinking agent, and a catalyst that does not catalyze the crosslinking reaction between hydroxy-functional resin and the crosslinking agent contained therein. In other words, the solventborne coating composition (solventborne coating composition) includes a catalyst that is inactive to the crosslinking of the hydroxy-functional resin and the crosslinking agent included in the solventborne coating composition but active to crosslinking the hydroxy-functional resin and the crosslinking agent contained in a neighboring waterborne coating composition (waterborne coating composition), while the waterborne coating composition includes a catalyst that is inactive to the crosslinking of the hydroxy-functional resin and the crosslinking agent included in the waterborne coating composition but active to the crosslinking of the hydroxy-functional resin and the crosslinking agent contained in a neighboring solventborne coating composition.

Inclusion of an inactive catalyst avoids any premature curing and/or reaction that would accompany an active catalyst, and thus improves the shelf-stability of the low temperature cure coating compositions; at least until the solventborne and the waterborne coating compositions come into contact with one another and the inactive catalyst from the solventborne coating composition diffuses into the waterborne coating composition where it is active and affects the crosslinking of the hydroxy-functional resin and the crosslinking agent in the waterborne coating composition, and, at the same time, the inactive catalyst from the waterborne coating composition diffuses into the solventborne coating composition where it is active and affects the crosslinking of the hydroxy-functional resin and the crosslinking agent in the solventborne coating composition.

The temperature stability and shelf life of the solventborne and the waterborne coating compositions may be improved by blocking or protecting the reactive groups of the crosslinking agent. Blocking the reactive groups of the crosslinking agent results in a higher onset curing temperature that enables the provision of single-component compositions in which the hydroxy-functional resin, the blocked crosslinking agent, and the catalyst configured to catalyze a crosslinking reaction between a different hydroxy-functional resin and crosslinking agent contained in a different low temperature cure coating composition are all contained in single-component or pre-mixed composition prior to the application of the coating composition. It should be noted, however, that if the crosslinking agents are too thermally stable, they are unable to cure in the desired temperature range from 80-120° C.

The low temperature cure composite coatings of the present invention include a first layer comprising a waterborne low temperature cure coating composition (waterborne coating composition) and a second layer comprising a solventborne low temperature cure coating composition (solventborne coating composition), where the first layer and the second layer are adjacent to each other, and preferably directly adjacent to each other. The waterborne coating composition comprises a first hydroxy-functional resin, a first crosslinking agent, a first catalyst, and water, while the solventborne coating composition comprises a second hydroxy-functional resin, a second crosslinking agent, a second catalyst, and an organic solvent.

The first layer, which is generally denoted as the bottom layer or the basecoat, of the low temperature cure composite coating is formed by applying the waterborne coating composition to a substrate, and the second layer, which is generally denoted as the top layer or the topcoat, is formed by applying the solventborne coating composition to the first layer. Once the second layer is formed on the first layer, the first catalyst contained in the first layer migrates into the second layer and the second catalyst contained in the second layer migrates into first layer.

Unlike the first catalyst originally contained in the waterborne coating composition, the second catalyst catalyzes the crosslinking reaction between the first hydroxy-functional resin and the first crosslinking agent contained in the waterborne coating composition. Likewise, and contrary to the second catalyst originally contained in the solventborne coating composition, the first catalyst catalyzes the crosslinking reaction between the second hydroxy-functional resin and the second crosslinking agent contained in the solventborne coating composition. Consequently, heating the low temperature cure composite coating to a temperature from 80 to 120° C. simultaneously cures the solventborne and the waterborne coating compositions to form an at least dual layer composite coating. Advantageously, both the solventborne coating composition and the waterborne coating composition cure in 20 minutes or less.

The solventborne and the waterborne coating compositions each include a hydroxy-functional resin. The hydroxy-functional resin of the waterborne coating composition is a hydroxy-functional polyether-containing polyurethane, while the hydroxy-functional resin of the solventborne coating composition is a hydroxy-functional acrylic resin or a hydroxy-functional polyester resin.

In addition, the solventborne and the waterborne coating compositions each include a crosslinking agent and a catalyst. The crosslinking agents included in the solventborne and the waterborne coating compositions are different, and thus, the catalyst in the solventborne and the waterborne coating compositions must be different.

The first low temperature crosslinking agent comprises an aminoplast resin comprising alkylol groups, which may be etherified. Melamine formaldehyde resins including methylol groups ($-CH_2OH$) and/or an alkoxymethyl groups are preferred.

The methylol and alkoxymethyl groups of the first low temperature crosslinking agent react with the hydroxyl groups of the first hydroxy-functional resin when catalyzed by an acid catalyst, such as an unblocked sulfonic acid. Thus, the acid catalyst is included in the solventborne coating composition and excluded from the waterborne coating composition. The acid catalyst is only introduced into the waterborne coating composition after the solventborne and the waterborne coating compositions are placed in contact with each other to form the low temperature composite coating.

The solventborne coating composition comprises an isocyanate (NCO) resin, which may be a blocked NCO resin. Blocking of the NCO functional groups provides resistance to hydroxyl groups of the hydroxy-functional resin at low temperatures, and thus, has a higher onset curing temperature.

Upon heating the second low temperature crosslinking agent, the blocking groups associated with the crosslinker (if present) will unblock themselves to reveal free NCO groups. Heating the second low temperature crosslinking agent in the presence of the metal catalyst facilitates removal of the blocking groups. Furthermore, heating of the NCO resin (or unblocked NCO resin) in the presence of a metal catalyst, such as an organo tin catalyst, causes the crosslinking between the hydroxyl groups of the second hydroxy-functional resin, to form a urethane coating. The metal catalyst necessary to catalyze the reaction between the second hydroxy-functional resin and the second low temperature crosslinking agent is included in the waterborne coating composition and excluded from the solvent borne coating composition. The metal catalyst is only introduced into the solventborne coating composition after the solventborne and the waterborne coating compositions are placed in contact with each other to form the low temperature composite coating.

The polymeric substrates coated with the solventborne and the waterborne coating compositions include thermoplastic materials, such as thermoplastic polyolefins (e.g., polyethylene, polypropylene), polyamides, polyurethanes, polyesters, polycarbonates, acrylonitrile-butadiene-styrene (ABS) copolymers, EPDM rubber, acrylic polymers, vinyl polymers, copolymers and mixtures thereof. Metallic substrates, fiberglass substrates, glass substrates, and carbon fiber substrates are also suitable.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
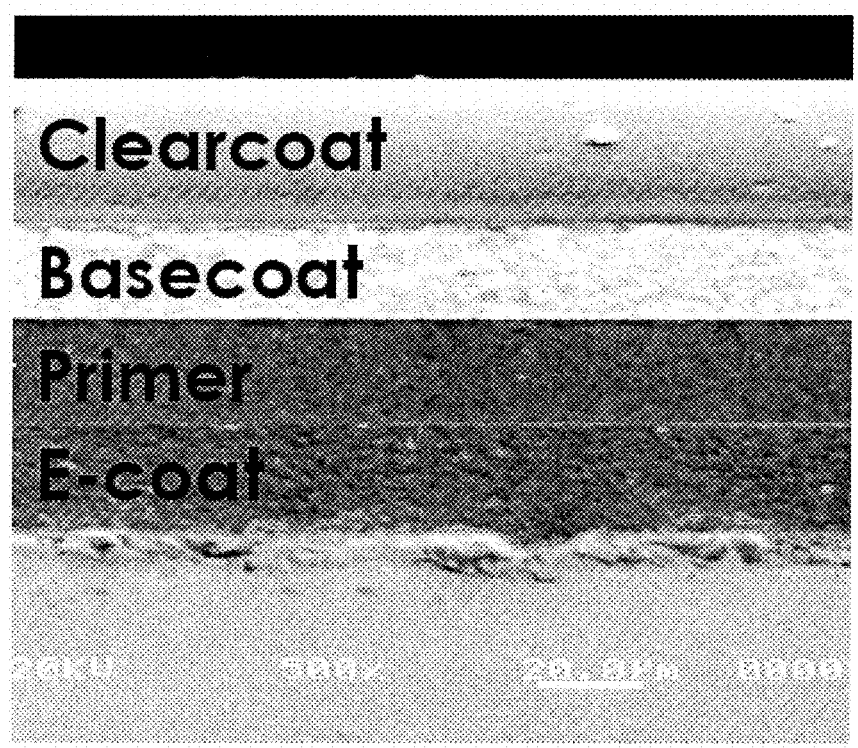
FIG. 1 shows a typical automotive coating containing the following four layers applied to the metal surface vehicle: an e-coat; a primer; a basecoat; and a clearcoat.
Figure 2:
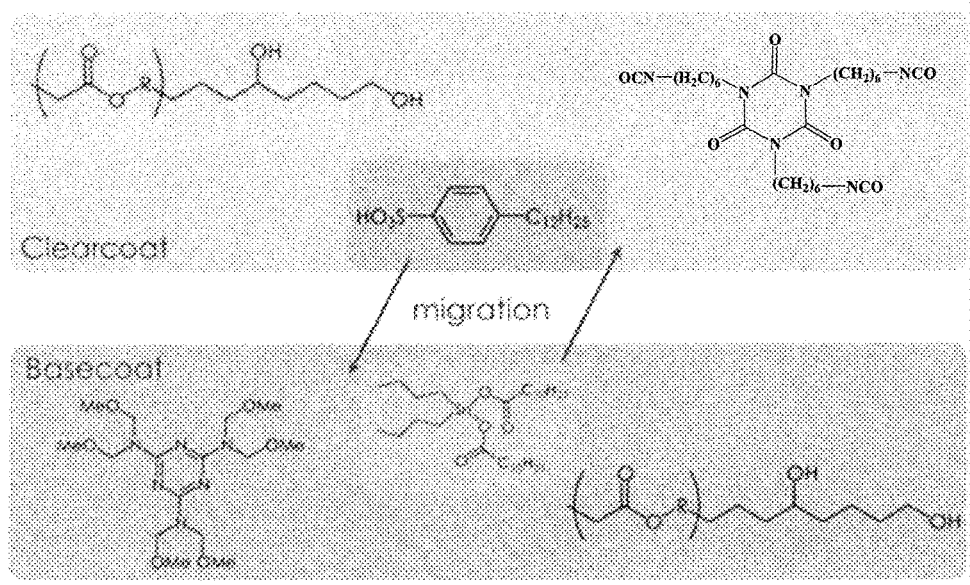
FIG. 2 shows a representation of the dual layer curing mechanism of the low temperature cure composite coating in which the metal catalyst—an organo tin catalyst—contained the basecoat migrates into a clearcoat formed thereon and an acid catalyst—an unblocked sulfonic acid catalyst or carboxylic acid catalyst—contained in the clearcoat migrates into the basecoat.

Referring now to the drawings, wherein like reference numerals designate identical or corresponding parts throughout the several views.

The present invention relates to low temperature cure coating compositions, low temperature cure composite coatings that are formed by a double layer curing mechanism, and articles comprising the low temperature cure composite coatings. The low temperature cure coating compositions cure at temperatures from 80 to 120° C., and thus, are suitable for heat sensitive or plastic substrates. The lower temperature coating compositions also cure in 20 minutes or less.

Waterborne Coating Composition (Basecoat)

The low temperature waterborne coating composition (waterborne coating composition) includes at least one hydroxy-functional resin, at least one low temperature crosslinking agent, and at least one metal catalyst. The hydroxy-functional resin of the waterborne coating composition is crosslinkable with the low temperature crosslinking agent contained therein. However, the metal catalyst does not catalyze the crosslinking reaction between the hydroxy-functional resin and the low temperature crosslinking agent contained in the waterborne coating composition; instead, the metal catalyst functions as a catalyst to crosslink a second hydroxy-functional resin and a second low temperature crosslinking agent contained in a solventborne coating composition that is disposed adjacent to and preferably in direct contact with the waterborne coating composition.

The waterborne coating composition may be a two-component system in which the first component of the system includes the hydroxy-functional resin and the metal catalyst and the second component of the system includes the first low temperature crosslinking agent. Alternatively, the first component of the system may include the first hydroxy-functional resin and the second component of the system may include the first low temperature crosslinking agent and the metal catalyst. Preferably the waterborne coating composition is a single-component basecoat containing the first hydroxy-functional resin, the first low temperature crosslinking agent, metal catalyst, and water (i.e., a premixed composition).

The one-component waterborne coating compositions of the basecoat have a pot life, which is defined as the amount of time for the viscosity to double at room temperature (23° C.), of at least 30 days, preferably at least 60 days, and most preferably at least 90 days.

The one-component waterborne coating compositions of the basecoat cure within 20 minutes or less when exposed to an acid catalyst. Preferably, the one-component waterborne coating compositions cure within 10 minutes or less. The curing of the waterborne coating composition is assessed by measuring the gel content, which is also commonly referred to as gel fraction, as it directly indicates the extent of cure resulting from the reaction, i.e., crosslinking, of the hydroxy-functional resin and low temperature crosslinking agent. The gel content of the cured basecoat corresponds to the insoluble fraction after storing the basecoat at room temperature under THF for 24 hours. Typically, the gel content is at least 95%, at least 98%, at least 99%, and even 99.9%.

The cured basecoat compositions have a microhardness greater than 50 N/mm², as determined in accordance with DIN EN ISO 14577 using the Fischerscope instrument from Fischer, with a maximum force of 25.6 mN.

First Hydroxy-Functional Resin

The hydroxy-functional resin in the waterborne coating composition may be any polymer having a hydroxyl functionality that is reactive with the functional groups of the first low temperature crosslinking agent contained in the waterborne coating composition. Preferably, the hydroxy-functional resin is a hydroxy-functional polyether-containing polyurethane.

The polyether-containing polyurethane comprises, in reacted form: (i) a polyester polyol; (ii) a low molecular weight diol and/or triol; (iii) a polyether diol; and (iv) a polyisocyanate, where any free isocyanate groups are reacted with a multi-functional alcohol. Alternatively, the polyether-containing polyurethane comprises, in reacted form: (i) a polyester polyol; (ii) a low molecular weight diol and/or triol; (iii) a polyisocyanate; (iv) a trihydroxy-containing monomer; and (v) a monofunctional polyether, where any free isocyanate groups are reacted with a multi-functional alcohol. The multifunctional alcohol reacted with the isocyanate groups may be a polyol, such as ethylene glycol or trimethylol propane, or an aminoalcohol, such as ethanolamine or diethanolamine, since the amino groups of the aminoalcohol preferentially react with the isocyanate groups present to provide the polyurethane with hydroxy-functional groups.

The polyester polyol of the polyether-containing polyurethane may be branched or unbranched, and is formed from the reaction of a dicarboxylic acid and alcohol having at least two hydroxyl moieties. The carboxylic acid of the polyester polyol generally has less than 18 carbon atoms in its chain. The dicarboxylic acids may be alkyl, alkylene, aralkyl, aralkylene, and arylene. Exemplary alkyl dicarboxylic acid compounds include azeleic acid and adipic acid, a suitable aromatic dicarboxylic acid is isophthalic acid. In certain embodiments, the carboxylic acid may have more than 2 carboxy groups, for example, trimellitic anhydride.

The alcohol of the polyester polyol may be a diol, a triol, or higher alcohol-functional compounds (e.g., trimethylol propane) in the case of the branched-chain polyurethanes, the amount and type of triol-containing compounds may be varied to increase the branching effect. The diols which are usually employed in making the polyester polyol include alkylene glycols, such as ethylene glycol, propylene glycol, butylene glycol, and neopentyl glycol, 1,6 hexanediol and other glycols such as hydrogenated bisphenol A, cyclohexane dimethanol, caprolactone diol, hydroxyalkylated bisphenols, and such. Higher functional alcohols include, for example, trimethylolpropane, trimethylolethane, and pentaerythritol, as well as higher molecular weight polyols.

The low molecular weight diol and/or triol of polyether-containing polyurethane is any di- or tri-alcohol containing compound having a hydroxyl number greater than 200 (e.g., from 1500 to 2000). Aliphatic diols, particularly alkylene polyols containing from 2 to 18 carbon atoms such as ethylene glycol, propylene glycol, 1,4-butanediol, neopentyl glycol, and cycloaliphatic diols such as 1,2 cyclohexanediol and cyclohexane dimethanol, are suitable. An especially preferred diol is 1,6 hexanediol. Exemplary higher functional alcohols include trimethylol propane, trimethylolethane, and pentaerythritol.

The polyisocyanate of the polyether-containing polyurethane may be essentially any polyisocyanate containing at least two isocyanate groups, and is preferably a diisocyanate. The diisocyanate is generally selected from p-phenylene diisocyanate, biphenyl 4,4'diisocyanate, toluene diisocyanate, 3,3'-dimethyl-4,4 biphenylene diisocyanate, 1,4-tetramethylene diisocyanate, 1,6-hexamethylene diisocyanate, 2,2,4-trimethylhexane-1,6 diisocyanate, methylene bis (phenyl isocyanate), 1,5 naphthalene diisocyanate, bis (isocyanatoethyl fumarate), isophorone diisocyanate (IPDI) and methylene-bis-(4 cyclohexylisocyanate). There can also be employed isocyanate-terminated adducts of diols, such as ethylene glycol, or 1,4-butylene glycol, etc. While diisocyanates are preferred, other multi-functional isocyanates such as 1,2,4-benzene triisocyanate and polymethylene polyphenyl isocyanate may be used.

The trihydroxy-containing monomers of the polyether-containing polyurethane include, for instance, polyols such as trimethylol propane, trimethylolethane, and pentaerythritol, as well as higher molecular weight polyols.

The monofunctional polyethers of the polyether-containing polyurethane are usually formed from monoalcohol initiated polymerization of ethylene oxide, propylene oxide, and mixtures thereof. A polyether compound comprised of 100% ethylene oxide units is especially preferred. Preferably, the monofunctional polyether comprises between 10 and 25% by weight of the final polyurethane resin and has a molecular weight of between 1200 and 3000.

The polyether diol of the polyether-containing polyurethane is obtained by reacting a monofunctional polyether described above with a polyisocyanate described above to produce a polyether half-capped diisocyanate, which is in turn reacted with a compound having at least one active amine hydrogen and at least two active hydroxyl groups. The obtained polyether diol has a polyether chain, a urea moiety, a urethane moiety, and two free hydroxyl groups.

Generally, the hydroxy-functional resin is present in the waterborne coating composition in an amount ranging from 10 to 90 percent by weight, preferably from 35 to 65 percent by weight, and more preferably from 45 to 65 percent by weight, based on a total weight of resin solids in the composition.

First Low Temperature Crosslinking Agent

The low temperature crosslinking agent of the waterborne coating composition comprises an aminoplast resin, which is reactive with the hydroxyl functionality of the first hydroxy-functional resin when catalyzed. Aminoplast resins are based on the condensation products of formaldehyde, with an amino- or amido-group carrying substance, such as melamine, urea, or benzoguanamine, preferably melamine.

The aminoplast resins preferably contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins are partially alkylated with methanol or butanol or mixtures thereof.

Melamine formaldehyde resins including either a methylol group ($-CH_2OH$), an alkoxymethyl group of general formula $-CH_2OR_1$, where $R_1$ is an alkyl chain having from 1 to 20 carbon atoms, preferably from 1 to 6 carbon atoms, more preferably from 1 to 4 carbon atoms, and combinations thereof are preferred.

The crosslinking agent of the waterborne coating composition is preferably selected from hexamethylol melamine (HMM), which has the following structure:

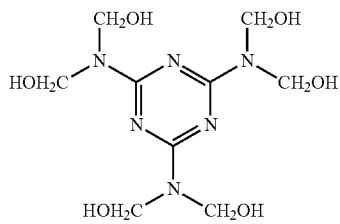 [SMILES: OCN(CO)c1nc(N(CO)CO)nc(N(CO)CO)n1]

hexamethoxymethyl melamine (HMMM), which has the following structure:

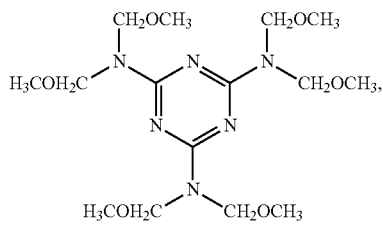

hexa(butoxymethyl) melamine (HBMM), which has the following structure:

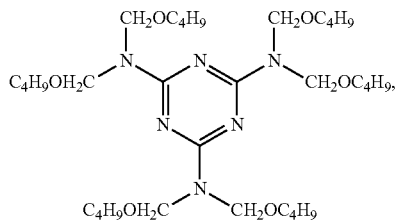

and melamines substituted with combinations of methylol groups, methoxymethyl groups, and/or butoxymethyl groups:

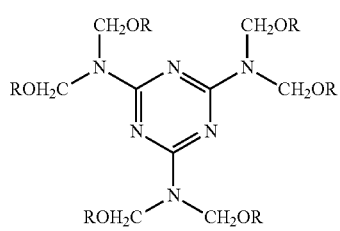

where each R is independently selected from H and $C_{1-4}$ alkyl groups, preferably $CH_3$ and $C_4H_9$, with the proviso that at least two R groups are different.

The methylol and alkoxymethyl groups of the low temperature crosslinking agent (e.g., the $CH_2OCH_3$ ether groups of HMMM) are particularly reactive with the hydroxyl groups of the hydroxy-functional resin when catalyzed by an acid catalyst such as an unblocked sulfonic acid. However, the waterborne coating composition does not comprise an acid catalyst, but instead includes a metal catalyst that does not catalyze a crosslinking reaction between hydroxyl groups of the hydroxy-functional resin and the low temperature crosslinking agent of the waterborne composition.

The low temperature crosslinking agent is present in the waterborne coating composition in an amount ranging from 10 to 90 percent by weight, preferably from 15 to 65 percent by weight, and more preferably from 20 to 40 percent by weight, based on a total weight of resin solids in the composition.

Metal Catalyst

The metal catalyst included in the waterborne coating composition is an organometallic compound selected from aliphatic bismuth carboxylates such as bismuth ethylhexanoate, bismuth subsalicylate (having an empirical formula $C_7H_5O_4Bi$), bismuth hexanoate, bismuth ethylhexanoate or dimethylol-propionate, bismuth oxalate, bismuth adipate, bismuth lactate, bismuth tartarate, bismuth salicylate, bismuth glycolate, bismuth succinate, bismuth formate, bismuth acetate, bismuth acrylate, bismuth methacrylate, bismuth propionate, bismuth butyrate, bismuth octanoate, bismuth decanoate, bismuth stearate, bismuth oleate, bismuth eiconsanoate, bismuth benzoate, bismuth malate, bismuth maleate, bismuth phthalate, bismuth citrate, bismuth gluconate; bismuth acetylacetonate; bis-(triorgano tin)oxides such as bis(trimethyl tin) oxide, bis(triethyl tin) oxide, bis(tripropyl tin) oxide, bis(tributyl tin) oxide, bis(triamyl tin) oxide, bis(trihexyl tin) oxide, bis(triheptyl tin) oxide, bis(trioctyl tin) oxide, bis(tri-2-ethylhexyl tin) oxide, bis(triphelihyl tin) oxide, bis(triorgano tin)sulfides, (triorgano tin)(diorgano tin) oxides, sulfoxides, and sulfones, bis(triorgano tin)dicarboxylates such as bis(tributyl tin) adipate and maleate; bis(triorgano tin)dimercaptides, triorgno tin salts such as trioctyl tin octanoate, tributyl tin phosphate; (triorgano tin)(organo tin)oxide; trialkylalkyloxy tin oxides such as trimethylmethoxy tin oxide, dibutyl tin diacetylacetonate, dibutyl tin dilaurate; trioctyl tin oxide, tributyl tin oxide, dialkyl tin compounds such as dibutyl tin oxide, dioctyl tin oxide, dibutyl tin dilaurate, dibutyl tin diacetate, dibutyl tin dimaleate, dibutyl tin distearate, dipropyl tin dioctoate and dioctyl tin oxide; monoalkyl tin compounds such as monobutyltin trioctanoate, monobutyl tin triacetate, monobutyl tin tribenzoate, monobutyl tin trioctylate, monobutyl tin trilaurate, monobutyl tin trimyristate, monomethyl tin triformate, monomethyl tin triacetate, monomethyl tin trioctylate, monooctyl tin triacetate, monooctyl tin trioctylate, monooctyl tin trilaurate; monolauryl tin triacetate, monolauryl tin trioctylate, and monolauryl tin trilaurate; zinc octoate, zinc naphthenate, zinc tallate, zinc carboxylates having from about 8 to 14 carbons in the carboxylate groups, zinc acetate; lithium carboxylates such as lithium acetate, lithium 2-ethylhexanoate, lithium naphthenate, lithium butyrate, lithium isobutyrate, lithium octanoate, lithium neodecanoate, lithium oleate, lithium versatate, lithium tallate, lithium oxalate, lithium adipate, lithium stearate; lithium hydroxide; zirconium alcoholates, such as methanolate, ethanolate, propanolate, isopropanolate, butanolate, tert-butanolate, isobutanolate, pentanolate, neopentanolate, hexanolate and octanolate; zirconium carboxylates such as formate, acetate, propionate, butanoate, isobutanoate, pentanoate, hexanoate, cyclohexanoate, heptanoate, octanoate, 2-ethylhexanoate, nonanoate, decanoate, neodecanoate, undecanoate, dodecanoate, lactate, oleate, citrate, benzoate, salicylate and phenylacetate; zirconium 1,3-diketonates such as acetylacetonate (2,4-pentanedionate), 2,2,6,6-tetramethyl-3,5-heptanedionate, 1,3-diphenyl-1,3-propanedionate (dibenzoylmethanate), 1-phenyl-1,3-butananedionate and 2-acetylcyclohexanonate; zirconium oxinate; zirconium 1,3-ketoesterates, such as methyl acetoacetate, ethyl acetoacetate, ethyl-2-methyl acetoacetate, ethyl-2-ethyl acetoacetate, ethyl-2-hexylacetoacetate, ethyl-2-phenyl-acetoacetate, propyl acetoacetate, isopropyl acetoacetate, butyl acetoacetate, tert-butyl acetoacetate, ethyl-3-oxo-valerate, ethyl-3-oxo-hexanoate, and 2-oxo-cyclohexane carboxylic acid ethyl esterate; zirconium 1,3-ketoamidates, such as N,N-diethyl-3-oxo-butanamidate, N,N-dibutyl-3-oxo-butanamidate, N,N-bis-(2-ethylhexyl)-3-oxo-butanamidate, N,N-bis-(2-methoxyethyl)-3-oxo-butanamidate, N,N-dibutyl-3-oxo-heptanamidate, N,N-bis-(2-methoxyethyl)-3-oxo-heptanamidate, N,N-bis-(2-ethylhexyl)-2-oxo-cyclopentane carboxamidate, N,N-dibutyl-3-oxo-3-phenylpropanamidate, N,N-bis-(2-methoxyethyl)-3-oxo-3-phenylpropanamidate; and combinations of the foregoing metal catalysts.

Advantageously, the metal catalyst is a dialkyl tin compound selected from dibutyltin oxide, dioctyl tin oxide, dibutyl tin dilaurate, dibutyl tin diacetate, dibutyl tin dimaleate, dibutyl tin distearate, dipropyl tin dioctoate, and dioctyl tin oxide. Dibutyl tin dilaurate is preferred.

The amount of the metal catalyst included in the waterborne coating composition is from 0.01 to 10 percent by weight, preferably from 0.05 to 7.5 percent by weight, and more preferably from 1.0 to 5.0 percent by weight, based on the total weight of resin solids in the coating composition. As a portion of the metal catalyst will migrate into the solventborne coating composition discussed below, the minimum content of the metal catalyst in the waterborne coating composition may be 1.5 percent by weight, 2.0 percent by weight, or 2.5 percent by weight, based on the total weight of resin solids in the composition.

In terms of a total weight of the composition solids in the waterborne coating composition, the amount of the metal catalyst may also range from 0.05 to 10 percent by weight, preferably from 0.25 to 7.5 percent by weight, and more preferably from 0.5 to 5.0 percent by weight. The minimum amount of the metal catalyst may be increased to at least 0.75 percent by weight, at least 1.0 percent by weight, or 2.0 percent by weight, based on the total weight of resin solids in the waterborne coating composition, to ensure sufficient migration of the metal catalyst into the solventborne coating composition.

Pigments and Colorants

The waterborne coating composition may be colored with at least one pigment or colorant. Examples of suitable pigments or colorants comprise metal oxides, such as zinc oxide, antimony oxide, iron oxides, titanium dioxide, and lead oxides; carbon black; mica, including mica-based effect pigments; metallic pigments, such as aluminum flakes, bronze flakes, nickel flakes, tin flakes, silver flakes, and copper flakes; and organic pigments, such as phthalocyanines, like copper phthalocyanine blue, perylene red and maroon, quinacridone magenta and dioxazine carbazole violet.

The pigments and colorants may range up to 50 percent by weight, up to 40 percent by weight, or up to 30 percent by weight, and may be as low as 10 percent by weight, as low as 5 percent by weight, or as low as 1 percent by weight, based on a total weight of the composition solids in the waterborne coating composition. In terms of the total weight of the waterborne coating composition, the content of the pigment or colorant ranges from 5 to 90 percent by weight, preferably from 10 to 70 percent by weight, and more preferably from 15 to 50 percent by weight.

Water

The waterborne coating composition comprises water. Although the waterborne coating may also contain a fraction (less than 15 percent by weight) of water miscible organic solvents, the waterborne coating composition typically includes water as the only dispersant.

The waterborne coating composition has a total solids content of 20 percent by weight or more, preferably 25 percent by weight or more, and more preferably 30 percent by weight or more, and up to 80 percent by weight, preferably up to 75 percent by weight, and more preferably up to 60 percent by weight, based on the total weight of the waterborne coating composition. Thus, the total diluent (water) content of the waterborne coating composition is at least 20 percent by weight, preferably at least 25 percent by weight, and more preferably at least 40 percent by weight and up to 80 percent by weight, preferably up to 75 percent by weight, and more preferably up to 70 percent by weight, based on the total weight of the waterborne coating composition.

Solventborne Coating Composition (Topcoat)

The low temperature solventborne coating composition (solventborne coating composition) includes at least one hydroxy-functional resin, at least one low temperature crosslinking agent, which is different from the crosslinking agent included in the waterborne coating composition, and at least one acid catalyst.

Analogous to the waterborne coating composition, the solventborne coating composition may be in the form of a one- or two-component system. Advantageously, the second low temperature coating composition is a two-component composition where one component contains the second hydroxy-functional resin and the other component contains the second low temperature crosslinking agent. The metal catalyst may be included with the second hydroxy-functional resin or the second low temperature crosslinking agent.

If the solventborne composition is in the form of a one-component coating composition in which the free NCO groups of the crosslinking agent are blocked, the one-component coating composition has a pot life of at least 30 days, preferably at least 60 days, and most preferably at least 90 days.

The solventborne coating compositions of the topcoat cure within 20 minutes or less when exposed to a metal catalyst. Preferably, the solventborne coating compositions coating compositions cure within 10 minutes or less. The gel content of the cured topcoat corresponds to the insoluble fraction after storing the topcoat at room temperature under THF for 24 hours. Typically, the gel content is at least 95%, at least 98%, at least 99%, and even 99.9%.

The cured topcoat compositions have a microhardness greater than 90 N/mm$^2$, preferably greater than 100 N/mm$^2$, and more preferably greater than 120 N/mm$^2$, as determined in accordance with DIN EN ISO 14577 using the Fischerscope instrument from Fischer, with a maximum force of 25.6 mN.

Second Hydroxy-Functional Resin

The hydroxy-functional resin of the solventborne coating composition is crosslinkable with the low temperature crosslinking agent contained therein. However, the acid catalyst does not catalyze a crosslinking reaction between the hydroxy-functional resin and the low temperature crosslinking agent contained in the solventborne coating composition; instead, the acid catalyst catalyzes the crosslinking of the hydroxy-functional resin and the low temperature crosslinking agent contained in the waterborne coating composition that is disposed adjacent to and preferably in direct contact with the solventborne coating composition.

The hydroxy-functional resin in the solventborne coating composition may be any polymer having a hydroxyl functionality that is reactive with the functional groups of the second low temperature crosslinking agent contained in the solventborne coating composition. Preferably, the hydroxy-functional resin is at least one member selected from the group consisting of an acrylic polymer having a hydroxyl functionality and a polyester polymer having a hydroxyl functionality. Most preferably the hydroxy-functional resin is an acrylic polymer having a hydroxyl functionality. Illustrative commercially available hydroxy-functional resins include those sold under the tradename JONCRYL®.

In addition to the hydroxy functional group, the hydroxy-functional resin may comprise a further reactive functionality so long as it is reactive with the functional groups of the second low temperature crosslinking agent contained in the solventborne coating composition. In certain embodiments, the hydroxy-functional resin includes at least one further functionality selected from the group consisting of an amine functionality, a carboxylic acid functionality, and an epoxy functionality.

The hydroxy-functional resin present in the solventborne coating composition may, in general, have any glass transition temperature which, in combination with the glass transition temperature of the second low temperature crosslinking agent and the equivalent weight of the hydroxy-functional resin, results in the production of a cured film having a desired hardness. Preferably the hydroxy-functional resin has a glass transition temperature of from −20° C. to 100° C., more preferably from 0° C. to 75° C., and most preferably from 10° C. to 50° C.

The hydroxy-functional resin present in the solventborne coating composition may have a number average molecular weight (Mn), as measured by gel permeation chromatography (GPC), from 500 to 30,000, or from 600 to 20,000, or from 750 to 10,000.

The hydroxy-functional resin present in the solventborne coating composition has a hydroxyl equivalent weight from 100 to 3,000 grams resin/eq hydroxyl, preferably from 200 to 1,500 grams resin/eq hydroxyl, and more preferably from 250 to 800 grams resin/eq hydroxyl, or even 300 to 700 grams resin/eq hydroxyl.

Suitable hydroxy-functional acrylic resins and polyester resins have sufficient hydroxyl contents for reactivity at the desired curing temperatures of 80 to 120° C., preferably 90 to 115° C., and more preferably from 100 to 110° C. The acrylic resins may have a hydroxyl number of from 15 to 565 mg KOH/g, preferably from 35 to 280 mg KOH/g, and more preferably from 70 to 225 mg KOH/g. The hydroxyl number may be less than 200 mg KOH/g, for instance less than 185 mg KOH/g, or less than 175 mg KOH/g. The hydroxy-functional acrylic resins generally have an average of at least two active hydrogen groups per molecule.

The hydroxy-functional resin is present in the solventborne coating composition in an amount ranging from 25 to 75 percent by weight, preferably from 35 to 65 percent by weight, and more preferably from 45 to 65 percent by weight, based on a total weight of resin solids in the composition.

Second Low Temperature Crosslinking Agent

The low temperature crosslinking agent of the solventborne coating composition comprises an isocyanate resin having free NCO groups that react with the hydroxyl groups of the hydroxy-functional resin to form urethane linkages (—NH—CO—O—) and thus a crosslinked urethane.

The isocyanate resin may have a number average molecular weight (Mn), as measured by gel permeation chromatography (GPC), from 100 to 20,000, from 150 to 10,000, or from 200 to 5,000. The isocyanate may have an NCO equivalent weight (grams of crosslinking agent/equivalent of NCO) from 50 to 1000, preferably from 100 to 500, and more preferably from 150 to 250.

The isocyanate resin may be any organic isocyanate that is suitable for crosslinking the hydroxy-functional resin of the solventborne coating composition. Preference is given to isocyanates containing from 3 to 36, in particular from 8 to about 15 carbon atoms. Examples of suitable diisocyanates include, but are not limited to, trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4-diphenylene diisocyanate (e.g. 4,4'-methylene bisdiphenyldiisocyanate), 1,5-naphthylene diisocyanate, 1,4-naphthylene diisocyanate, 1-isocyanatomethyl-3-isocyanato-3,5,5-trimethylcyclohexane (isophorone diisocyanate or IPDI), 1,3-bis(1-isocyanato-1-methylethyl)benzene (m-tetramethylxylene diisocyanate or TMXDI), bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexane. Of these, hexamethylene diisocyanate, IPDI, and TMXDI are preferred. It is also possible to use polyisocyanates of higher isocyanate functionality. Examples of these include tris(4-isocyanatophenyl)methane, 1,3,5-triisocyanatobenzene, 2,4,6-triisocyanatotoluene, 1,3,5-tris(6-isocyanatohexylbiuret), bis(2,5-diisocyanato-4-methylphenyl)methane, 1,3,5-tris(6-isocyanatohexyl)-1,3,5-triazinane-2,4,6-trione (i.e., hexamethylene diisocyanate cyclic trimer), 1,3,5-tris(6-isocyanatohexyl) and polymeric polyisocyanates, such as dimers and trimers of diisocyanatotoluene. It is further also possible to use mixtures of polyisocyanates. The isocyanates which come into consideration for use as the crosslinker in the invention can also be prepolymers which are derived for example from a polyol, including a polyether polyol or a polyester polyol.

In certain embodiments, the NCO groups of the isocyanate resin may be blocked such that more than 90% of the NCO groups are blocked, preferably more than 95%, more than 99%, or more than 99.5% of the NCO groups are blocked. The second low temperature crosslinking agent may even be completely devoid of free NCO groups. The second hydroxy functional-resin should be devoid of free NCO groups and in certain embodiments the entire solventborne coating composition that forms the topcoat is devoid of free NCO groups.

The blocking agents may be used individually or in combination. Suitable blocking agents include ether alcohols, alkyl alcohols, oximes, amines, amides, hydroxylamines, or any compound with active hydrogen.

Typical alkyl alcohol blocking agents are aliphatic, cycloaliphatic or aromatic alkyl monoalcohols having 1-20 carbon atoms in the alkyl group, for example, methanol, ethanol, n-propanol, butanol, pentanol, hexanol, heptanol, octanol, nonanol, 2-ethyl hexanol, 3,3,5-trimethylhexan-1-ol, cyclopentanol, cyclohexanol, cyclooctanol, phenol, pyridinol, thiophenol, cresol, phenylcarbinol, and methylphenylcarbinol.

Typical ether alcohol blocking agents are ethylene glycol mono alkyl ether, diethylene glycol mono alkyl ether, propylene glycol mono alkyl ether or dipropylene glycol mono alkyl ether with alkyl group of 1-10 carbon atoms, for example, diethylene glycol mono butyl ether, ethylene glycol butyl ether, diethylene glycol mono methyl ether, ethylene glycol methyl ether, dipropylene glycol mono methyl ether, dipropylene glycol mono butyl ether, propylene glycol mono butyl ether, propylene glycol mono methyl ether.

Typical oxime blocking agents are methyl ethyl ketone oxime, methyl isopropyl ketone, methyl isobutyl ketone oxime, methyl isoamyl ketone oxime, methyl n-amyl ketone oxime, methyl 2-ethylhexyl ketone oxime, cyclobutanone oxime, cyclopentanone oxime, cyclohexanone oxime, 3-pentanone oxime, diisopropyl ketone oxime, diisobutyl ketone oxime, di-2-ethylhexyl ketone oxime, acetone oxime, formaldoxime, acetaldoxime, propionaldehyde oxime, butyraldehyde oxime, glyoxal monoxime, diacetyl monoxime.

A typical hydroxylamine blocking agent is ethanolamine. Typical amide blocking agents are caprolactam, methylacetamide, succinimide, and acetanilide. Amine blocking agents include dibutylamine and diisopropylamine.

A preferred mixture of blocking agents is glycerol and an oxime, such as cyclohexanone oxime, diisopropyl ketone oxime, or di-2-ethylhexyl ketone oxime.

The higher the temperature at which the blocking groups dissociate, the less likely that the low temperature crosslinking agent will be able to undergo the necessary crosslinking reaction in the presence of the metal catalyst at 80-120° C.; however, in the absence of a sufficiently stable blocking group, the solventborne coating composition is provided as a two-component system. For one-component systems, the blocking groups of the low temperature crosslinking agent unblock at a temperature from 40 to 80° C., preferably from 45 to 70° C., more preferably from 50 to 70° C.

Examples of blocked crosslinking agents of the solvent-borne coating composition are represented by formulae (I)-(VIII):

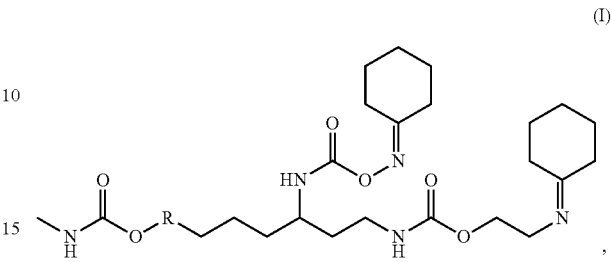

(I)

where R represents a $C_{1-20}$ alkyl group;

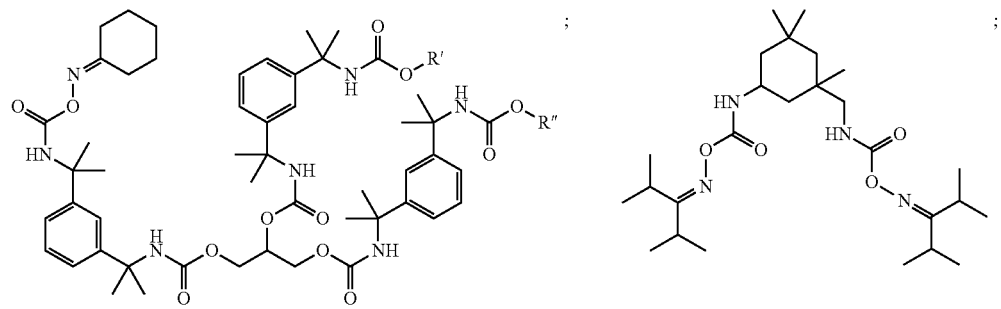

(II)

(III)

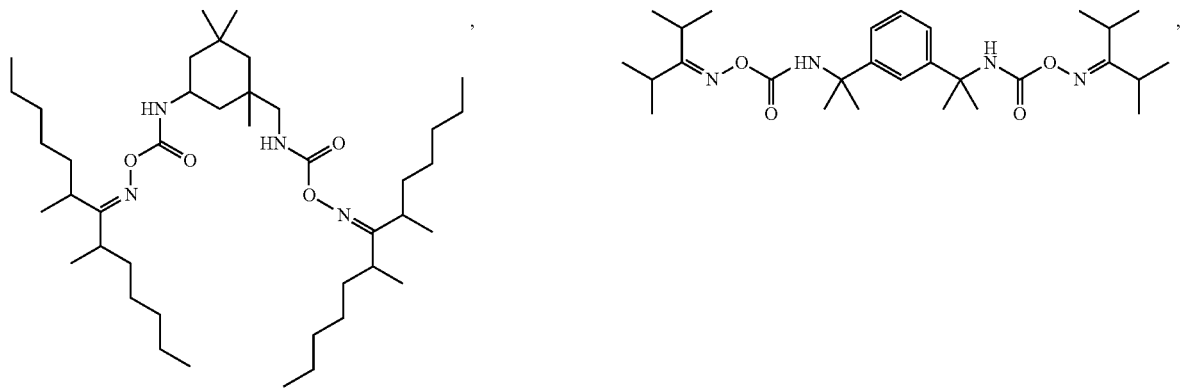

(IV)

(V)

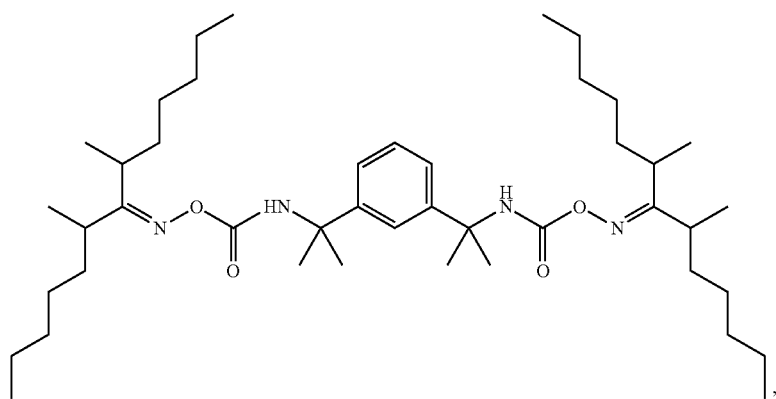

(VI)

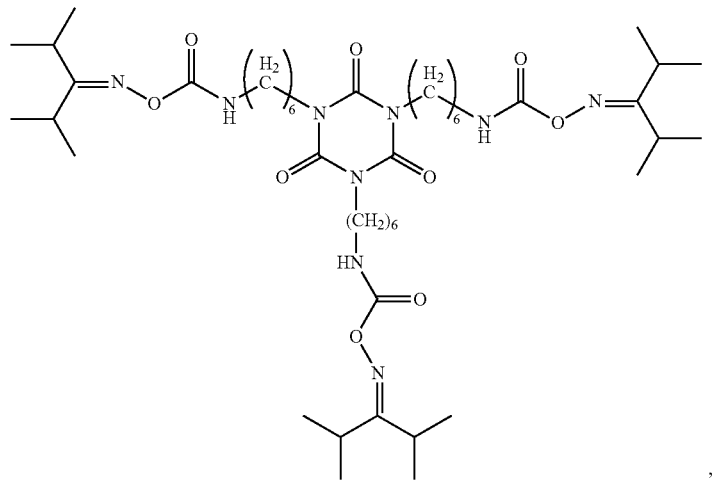

, and

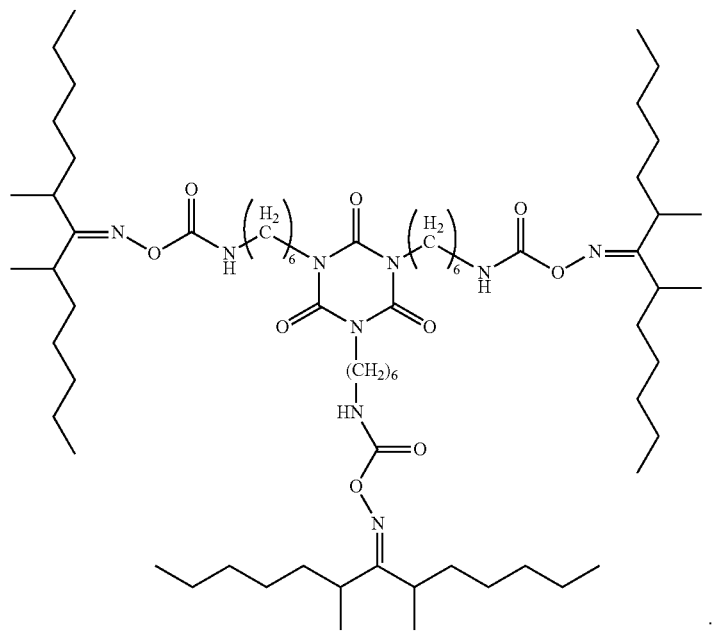

The low temperature crosslinking agent of formula (II) is a combination of glycerol and cyclohexanone oxime blocking agents with 1,3-bis(2-isocyanatopropan-2-yl)benzene, also known as m-tetramethylxylene diisocyanate or TMXDI. In formula (II), R' and R" may represent isocyanates blocked with cyclohexanone oxime, isocyanates blocked with glycerol, or oligomerized combinations of the two blocking reagents.

The use of two blocking agents, such as an oxide and glycerol, provides the blocked isocyanate with structural irregularity, thereby decreasing the crystallinity and increasing the solubility in the ketone, acetate, and ester solvents. In certain embodiments, from 25% to 45% of the blocked functionality is from a blocking agent such as glycerol and from 55% to 75% is from an oxime blocking agent such as cyclohexanone oxime on a molar basis, preferably from 30% to 40% from the glycerol and from 60% to 70% of the oxime blocking agent.

Although the blocking groups of the blocked isocyanate resin (e.g., cyclohexanone oxime) are not reactive with the hydroxyl groups of the hydroxy-functional resin, free isocyanate groups formed by the removal of the blocking groups are. The free isocyanate groups are provided by combining the blocked isocyanate resin and a metal catalyst at elevated temperatures. Once formed, the free isocyanate groups react with the hydroxyl groups of the hydroxy-functional resin in the presence of the metal catalyst to cure the solventborne coating composition and to provide the urethane coating. As noted above, however, the solventborne coating composition does not comprise a metal catalyst, but instead includes an acid catalyst such as an unblocked organic sulfonic acid. The metal catalyst is incorporated into the solventborne coating composition upon contacting the solventborne coating composition and the waterborne coating composition.

The low temperature crosslinking agent is present in the solventborne coating composition in an amount ranging from 25 to 75 percent by weight, preferably from 35 to 65 percent by weight, and more preferably from 45 to 55 percent by weight, based on a total weight of resin solids in the composition.

Acid Catalyst

The acid catalyst included in the solventborne coating composition may be an unblocked acid catalyst or a carboxylic acid catalyst. Preferably, the unblocked catalyst comprises an organic sulfonic acid, particularly para-toluenesulfonic acid (pTSA), methanesulfonic acid (MSA), dodecylbenzene sulfonic acid (DDBSA), dinonylnaphthalene disulfonic acid (DNNDSA), and mixtures thereof. Suitable carboxylic acid catalysts include dimethylolpropionic acid, trimethylol acetic acid, dimethyl butyric acid, dimethyl pentanoic acid, butyric acid, hexanoic acid, heptanoic acid, octanoic acid, pelargonic acid, decanoic acid, 2-ethylhexanoic acid, and lauric acid.

The acid catalyst functions to catalyze the reaction between the methylol and alkoxymethyl groups of the low temperature crosslinking agent (e.g., the $CH_2OCH_3$ ether groups of HMMM) with the hydroxyl groups of the hydroxy-functional resin contained in the waterborne coating composition discussed above.

The amount of the acid catalyst included in the solventborne coating composition is from 0.1 to 10 percent by weight, preferably from 0.05 to 7.5 percent by weight, and more preferably from 1.0 to 5.0 percent by weight, based on the total weight of resin solids in the solventborne coating composition. As a portion of the acid catalyst will migrate into the waterborne coating composition, the minimum content of the acid catalyst in the solventborne coating composition may be 1.5 percent by weight, 2.0 percent by weight, or 2.5 percent by weight, based on the total weight of resin solids in the composition.

In terms of a total weight of the composition solids in the solventborne coating composition, the amount of the acid catalyst may also range from 0.05 to 10 percent by weight, preferably from 0.25 to 7.5 percent by weight, and more preferably from 0.5 to 5.0 percent by weight. The minimum amount of the acid catalyst may be increased to at least 0.75 percent by weight, at least 1.0 percent by weight, or 2.0 percent by weight, based on the total weight of resin solids in the composition, to ensure sufficient migration of the acid catalyst into the waterborne coating composition.

Pigments and Colorants

The solventborne coating composition may also be colored with at least one pigment or colorant. The pigments and colorants included in the solventborne coating composition are the same as those described above for the waterborne coating composition.

The pigments and colorants may range up to 50 percent by weight, up to 40 percent by weight, or up to 30 percent by weight, and may be as low as 10 percent by weight, as low as 5 percent by weight, or as low as 1 percent by weight, based on a total weight of the composition solids in the solventborne coating composition. In terms of the total weight of the solventborne coating composition, the content of the pigment or colorant ranges from 5 to 90 percent by weight, preferably from 10 to 70 percent by weight, and more preferably from 15 to 50 percent by weight. Advantageously, the solventborne coating is free of pigments and/or colorants.

Solvents

Suitable solvents for the solventborne coating composition include aromatic solvents, such as toluene, xylene, naptha, and petroleum distillates; aliphatic solvents, such as heptane, octane, and hexane; ester solvents, such as butyl acetate, isobutyl acetate, butyl propionate, ethyl acetate, isopropyl acetate, butyl acetate, amyl acetate, hexyl acetate, heptyl acetate, ethyl propionate, isobutylene isobutyrate, ethylene glycol diacetate, and 2-ethoxyethyl acetate; ketone solvents, such as acetone, methyl ethyl ketone, methyl amyl ketone, and methyl isobutyl ketone; lower alcohols, such as methanol, ethanol, isopropanol, n-butanol, 2-butanol; glycol ethers such as ethylene glycol monobutyl ether, diethylene glycol butyl ether; glycol ether esters such as propylene glycol monomethyl ether acetate, ethylene glycol butyl ether acetate, 3-methoxy n-butyl acetate; lactams, such as N-methyl pyrrolidone (NMP); and mixtures thereof. In certain embodiments the solvent is VOC exempt solvent such as chlorobromomethane, 1-bromopropane, $C_{12-18}$ n-alkanes, t-butyl acetate, perchloroethylene, benzotrifluoride, p-chlorobenzotrifluoride, acetone, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane. Preferably, the solvent of the solventborne coating composition is at least one selected from a lower alcohol such as butanol and an ester such as t-butyl acetate. Advantageously, no water is included in the solventborne coating composition.

The solventborne coating composition has a total solids content of 20 percent by weight or more, preferably 25 percent by weight or more, and more preferably 30 percent by weight or more, and up to 80 percent by weight, preferably up to 75 percent by weight, and more preferably up to 60 percent by weight, based on the total weight of the solventborne coating composition. The total diluent (organic solvent) content of the solventborne composition ranges from at least 5 percent by weight up to 80 percent by weight, preferably at least 10 percent by weight up to 70 percent by weight, and more preferably at least 15 percent by weight up to 50 percent by weight, based on the total weight of the composition.

Additives

Each of the solventborne and the waterborne coating compositions may also contain other additives such as surfactants, stabilizers, wetting agents, rheology control agents, dispersing agents, UV absorbers, hindered amine light stabilizers, adhesion promoters, etc. These additives may account for 0.1 to 5 percent by weight, preferably from 0.5 to 4 percent by weight, and more preferably from 0.5 to 2.5 percent by weight, based on the total weight of resin solids in the respective coating compositions.

The solventborne and the waterborne coating compositions are applied to a substrate to form a low temperature cure composite coating. Suitable substrates include wood, fiberglass, metal, glass, cloth, carbon fiber, and polymeric substrates.

Suitable metal substrates that can be coated include ferrous metals such as iron, steel, and alloys thereof, non-ferrous metals such as aluminum, zinc, magnesium and alloys thereof, and combinations thereof. Useful polymeric substrates include thermoplastic materials, such as thermoplastic polyolefins (e.g., polyethylene, polypropylene), polyamides, polyurethanes, polyesters, polycarbonates, acrylonitrile-butadiene-styrene (ABS) copolymers, EPDM rubber, acrylic polymers, vinyl polymers, copolymers and mixtures thereof. Thermoplastic polyolefins are preferred.

The solventborne and the waterborne coating compositions are particularly useful for coating polymeric substrates that are found on motor vehicles such as automobiles, trucks, and tractors. The solventborne and the waterborne coating compositions may also be applied to molded articles, toys, sporting goods, and cases or coverings for electronic devices and small appliances. The components can have any shape, but preferably are in the form of automotive body components such as bodies (frames), hoods, doors, fenders, bumpers and/or trim for automotive vehicles.

The low temperature cure composite coatings are formed by successively applying the waterborne coating composition and the solventborne coating composition to a substrate. Applying the waterborne coating composition to the substrate provides a basecoat. After applying the basecoat, the water may be partially or completely driven from the basecoat by heating or air-drying, for instance a portion of the water may be partially removed with an ambient flash at 37-60° C. that last for 1 to 10 minutes. The ambient flash removes enough water to raise the solids content of the basecoat from 60 to 95 percent by weight, from 70 to 90 percent by weight, or from 75 to 85 percent by weight. Alternatively, no water may be removed from basecoat disposed on the substrate. Any heating of the basecoat should be conducted without premature crosslinking between the hydroxy-functional resin and the low temperature crosslinking agent or the self-crosslinking of these components since any crosslinking will diminish the ability of the catalysts to migrate in and out of the basecoat.

After applying the basecoat, which may be partially or completely dried, the solventborne coating composition is applied to the basecoat, to obtain a topcoat. Together, the basecoat and the topcoat form a low temperature cure composite coating. The topcoat is advantageously a clearcoat. In this context, topcoat does not necessarily mean it is the outermost coat as other layers may be included on the topcoat. Likewise, the basecoat is not necessarily the first coat in contact with the substrate as additional layers may be provided on the substrate under the basecoat, for example, an e-coat or a primer layer.

The initially deposited basecoat includes a first hydroxy-functional resin, the aminoplast crosslinking agent, and the metal catalyst, while the initially deposited topcoat includes a second hydroxy-functional resin, the isocyanate crosslinking agent, and the acid catalyst.

After disposing the topcoat on the substrate provided with the basecoat such that the topcoat and basecoat contact each other, the metal catalyst in the basecoat partially migrates into the topcoat and the acid catalyst in the topcoat partially migrates into the basecoat. As a result, the low temperature cure composite coating ultimately comprises a substrate, a final basecoat, and a final topcoat, where the final basecoat comprises the first hydroxy-functional resin, the aminoplast crosslinking agent, the acid catalyst, and the metal catalyst, and where the final topcoat comprises the second hydroxy-functional resin, the isocyanate crosslinking agent, the acid catalyst, and the metal catalyst.

Notably, while the first hydroxy-functional resin and the aminoplast crosslinking agent are unable to self-crosslink or crosslink with each other in the presence of the metal catalyst, the first hydroxy-functional resin and the aminoplast crosslinking agent are able crosslink with each other in the presence of the acid catalyst that migrated into the basecoat from the topcoat. Likewise, although the second hydroxy-functional resin and the isocyanate crosslinking agent are unable to self-crosslink or crosslink with each other in the presence of the acid catalyst, the second hydroxy-functional resin and the isocyanate crosslinking agent are able crosslink with each other in the presence of the metal catalyst that migrated into the topcoat from the basecoat. Accordingly, heating the low temperature cure composite coatings to a temperature from 80 to 120° C., preferably 90 to 115° C., and more preferably from 100 to 110° C., simultaneously cures the basecoat and the topcoat to provide a dual layer composite coating. In the curing operation, any remaining diluents are driven off and the film-forming materials of the basecoat and the topcoat are each crosslinked.

The acid catalyst and the metal catalyst are each independently included in the basecoat of the composite coating in an amount from 0.01 to 10 percent by weight, preferably from 0.05 to 7.5 percent by weight, and more preferably from 1.0 to 5.0 percent by weight, based on the total weight of resin solids in the basecoat. Since the acid catalyst migrated into the basecoat from the topcoat, the content of the acid catalyst is generally less than the content of the metal catalyst in the basecoat, for instance, by at least 0.25 percent by weight, at least 0.5 percent by weight, or at least 1 percent by weight. The acid catalyst and the metal catalyst are also each independently included in the topcoat of the composite coating in an amount from 0.01 to 10 percent by weight, preferably from 0.05 to 7.5 percent by weight, and more preferably from 1.0 to 5.0 percent by weight, based on the total weight of resin solids in the topcoat. Since the metal catalyst migrated into the topcoat from the basecoat, the content of the metal catalyst in the topcoat is generally less than the content of the acid catalyst, for instance, by at least 0.25 percent by weight, at least 0.5 percent by weight, or at least 1 percent by weight.

Each of the solventborne and the waterborne coating compositions are applied to the substrate in order to give dry film thicknesses from 5 to 90 µm, preferably from 7.5 to 75 µm, and more preferably from 10 to 50 µm. For instance, the dry film thickness of the basecoat is from 5 to 35 µm, preferably from 10 to 30 µm, and more preferably about 20 µm, and the dry film thickness of the topcoat is from 10 to 70 µm preferably from 25 to 50 µm, and more preferably about 45 µm.

The migration of the catalyst into each of the basecoat and topcoat may be determined by laser ablation inductively coupled plasma mass spectrometry (ICP MS) depth profiling or laser ablation complimented with ex situ X-ray photoelectron spectroscopy (XPS). The metal catalyst of the basecoat migrates at least 15 µm, preferably 25 µm, and more preferably entirely through the topcoat. Similarly, the acid catalyst of the topcoat migrates at least 20 µm, preferably 30 µm, and more preferably entirely through the basecoat.

In an alternative embodiment, the basecoat may comprise the isocyanate crosslinking agent and the topcoat may comprise the aminoplast crosslinking agent. In this case, the content of the metal catalyst in the basecoat could be less than the content of the acid catalyst, and the content of the acid catalyst in the topcoat could be less than the content of the metal catalyst in the resulting low temperature composite coating.

The invention is further described in the following examples, which are merely illustrative and do not limit the scope of the invention as described.

EXAMPLES

Example 1

A waterborne basecoat formulation was prepared by mixing 469.5 grams of an aqueous polyester-polyurethane resin (192.5 grams of solids), 86.8 grams of hexa(methoxymethyl)melamine (Resimene® 747, 82.5 grams of solids), 11.0 grams of 2,4,7,9-tetramethyldec-5-yne-4,7-diol (TMDD), 55.0 grams of ethylene glycol monobutyl ether, and 115.9 grams of deionized water with a mixture containing 27.5 grams of a polypropylene glycol (Puracol® P1010, 27.5 grams solids), 68.8 grams of ethylene glycol monobutyl ether, and 27.5 grams of dibutyltin dilaurate (DBTDL, 27.5 grams solids). Next, 159.1 grams of deionized water were added to reduce the viscosity of the basecoat composition to 70 cps at 25° C.

A two component solventborne topcoat formulation was prepared by mixing 382.4 grams of an acrylic resin (260.0 grams of solids), 0.8 grams of a solution of a polyether modified polymethylalkylsiloxane (BYK-325), 40.0 grams of ethylene glycol monobutyl ether acetate, 280 grams of n-amylacetate, and 40 grams of 4-dodecylbenzenesulfonic acid (DDBSA, NAXCAT® 1270, 70 wt % solution), to prepare the first component. The second component was prepared by mixing 140 grams of an aliphatic polyisocyanate (Desmodur® N3300 HDI trimer) 27.2 grams of n-butylacetate, and 27.2 grams of naptha. The first and second components were mixed prior to being applied to form the solventborne topcoat.

A low temperature cure composite coating was prepared by: depositing the waterborne basecoat composition on an aluminum substrate; drying the basecoat for 10 minutes at 43.3° C.; and depositing, on the partially dried basecoat, the solventborne topcoat composition.

Figure 3:
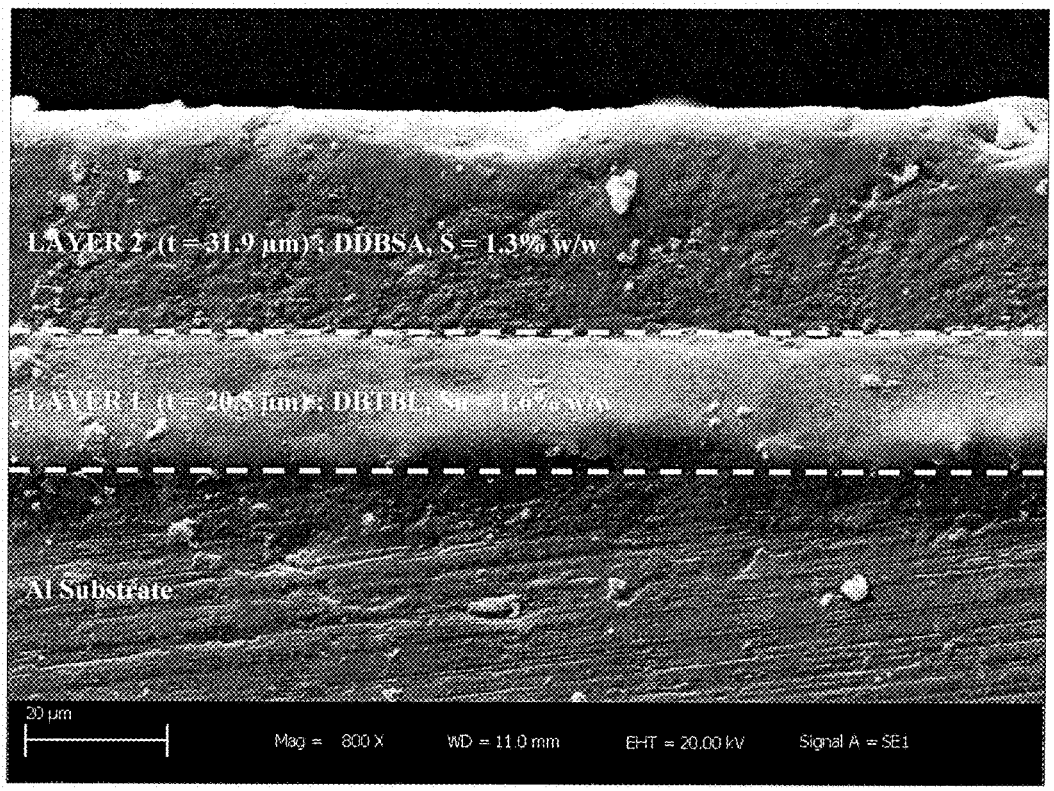
FIG. 3 shows a secondary electron micrograph of a dual layer composite coating obtained by curing the low temperature cure composite coating of Example 1.

The low temperature cure composite coating was cured at a temperature of 83.3° C. for 20 minutes, to provide a dual layer composite coating, including: a clear basecoat having a thickness of 20.5 μm and a urethane topcoat (clearcoat) having a thickness of 31.9 μm. A secondary electron micrograph of the dual layer composite coating on the aluminum substrate is shown in FIG. 3.

The dual layer composite coating was analyzed with a Zeiss EVO® MA15 scanning electron microscope equipped with a tungsten thermionic source and an EDAX® Genesis XM-4 analyzer employing a Si—Li X-ray detector. The compositional results of the basecoat are shown in Table 1:

TABLE 1

| Element | Weight % | Atomic % |
| --- | --- | --- |
| C K | 80.21 | 84.4 |
| N K | 5.98 | 5.4 |
| O K | 12.31 | 9.73 |
| Al K | 0.51 | 0.24 |
| Si K | 0.06 | 0.03 |
| S K | 0.38 | 0.15 |
| Sn L | 0.54 | 0.06 |
| Total | 100 | 100 |

The compositional results of the topcoat are shown in Table 2:

TABLE 2

| Element | Weight % | Atomic % |
| --- | --- | --- |
| C K | 78.62 | 82.9 |
| N K | 7.37 | 6.66 |
| O K | 12.6 | 9.97 |
| Al K | 0.01 | 0.01 |
| Si K | 0.1 | 0.04 |
| S K | 0.96 | 0.38 |
| Sn L | 0.34 | 0.04 |
| Total | 100 | 100 |

Importantly, the basecoat contains 0.38 percent by weight of sulfur and the topcoat contains 0.96 percent by weight of sulfur. Aside from the qualitative result of the basecoat and the topcoat curing at a temperature of 83.3° C. without the necessary catalyst for the crosslinking reactions being included in each of their film-forming compositions, the compositional results confirm that the DDBSA that was originally only contained in the topcoat migrated into the basecoat. The atomic ratio of sulfur to carbon in the basecoat is 0.0017 and the atomic ratio of sulfur to carbon in the topcoat is 0.0046.

Although trace amounts of Sn were observed visually in the X-ray spectra of the basecoat and the topcoat in this example, the content of Sn detected in each of the basecoat (0.6 atomic percent) and topcoat (0.04 atomic percent) are technically below the detection limit at <0.1 atomic percent.

To further analyze the migration of the sulfur and tin in the dual layer composite coating, laser ablation inductively coupled plasma mass spectrometry (ICP MS) depth profiling as well as laser ablation complimented with ex situ X-ray photoelectron spectroscopy (XPS) were carried out.

The laser ablation was performed with a CEM LSX-213 laser unit. The ablation size was 200 μm, and the laser parameters were tuned to achieve a sufficient number of data points. For instance, the laser parameters were adjusted to provide 21 ablation steps with a thickness of 2.5 μm per step for the ICP MS analysis.

The ICP MS was performed with a Perkin Elmer NexION 300D. The XPS was performed with Kratoz Axis Ultra at the University of Michigan.

Figure 4A:
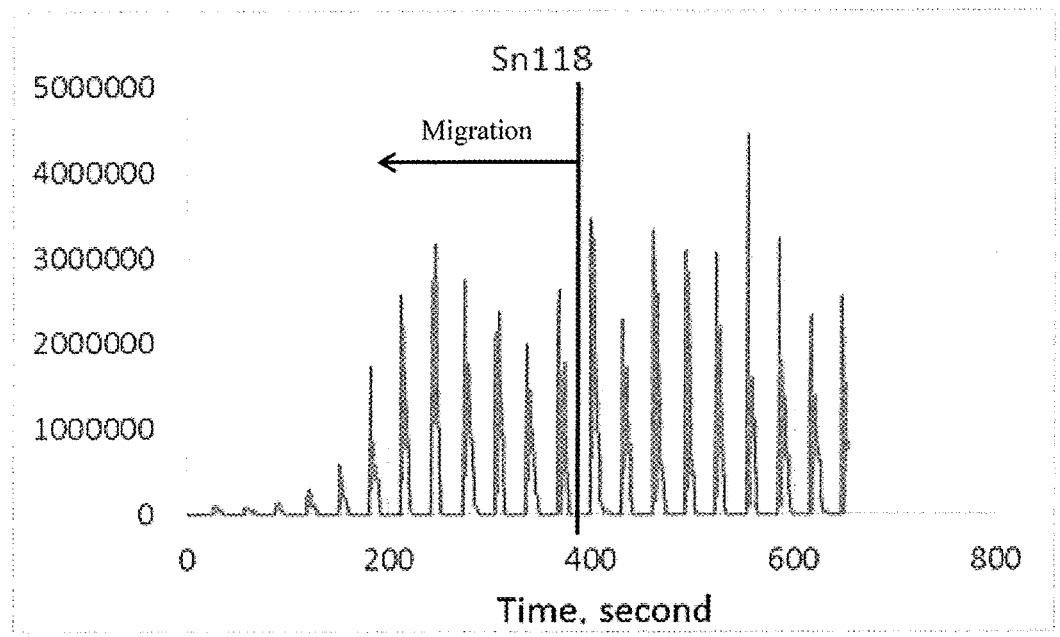
FIG. 4A shows a laser ablation inductively coupled plasma mass spectrometry (ICP MS) depth profile of $^{118}$Sn in a dual layer composite coating that includes a clearcoat and a basecoat, where the migration of an organo tin catalyst from the basecoat into the clearcoat is observed. The solid vertical line represents the interface between the clearcoat (left of line) and the basecoat (right of line).
Figure 4B:
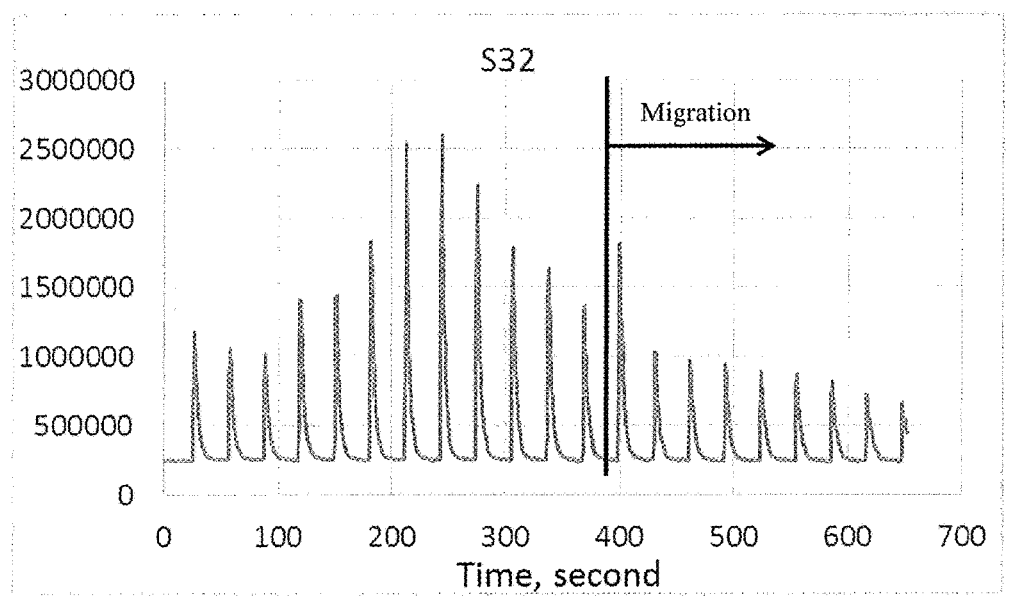
FIG. 4B shows a laser ablation ICP MS depth profile of $^{32}$S in the dual layer composite coating of FIG. 4A, where the migration of an unblocked sulfonic acid catalyst from the clearcoat into basecoat is observed. The solid vertical line represents the interface between the clearcoat (left of line) and the basecoat (right of line).

FIGS. 4A and 4B show the results of the laser ablation with ICP MS. In FIG. 4A, the migration of DBTDL from the basecoat into the topcoat is observed by monitoring the $^{118}$Sn signal through the dual layer composite coating to the Al substrate, which was simultaneously monitored with the $^{27}$Al signal. $^{13}$C was also simultaneously monitored and is essentially constant through the dual layer composite coating except for an increase in step 13, which is the first step beyond the basecoat-topcoat interface.

Based on the ablation step size of 2.5 μm, the DBTBL catalyst migrates around 15 μm into the topcoat. Beyond 15 μm from the interface of the basecoat and the topcoat, the $^{117}$Sn signal drops rapidly towards the surface of the topcoat.

In FIG. 4B, the migration of DDBSA from the topcoat into the basecoat is observed by monitoring the $^{32}$S signal through the dual layer composite coating to the Al substrate. Based on the ablation step size of 2.5 μm, the DDBSA catalyst migrates around 20 μm into the basecoat. Beyond 20 μm from the interface of the basecoat and the topcoat, the $^{32}$S signal drops gradually through the basecoat towards the Al substrate.

Figure 5A:
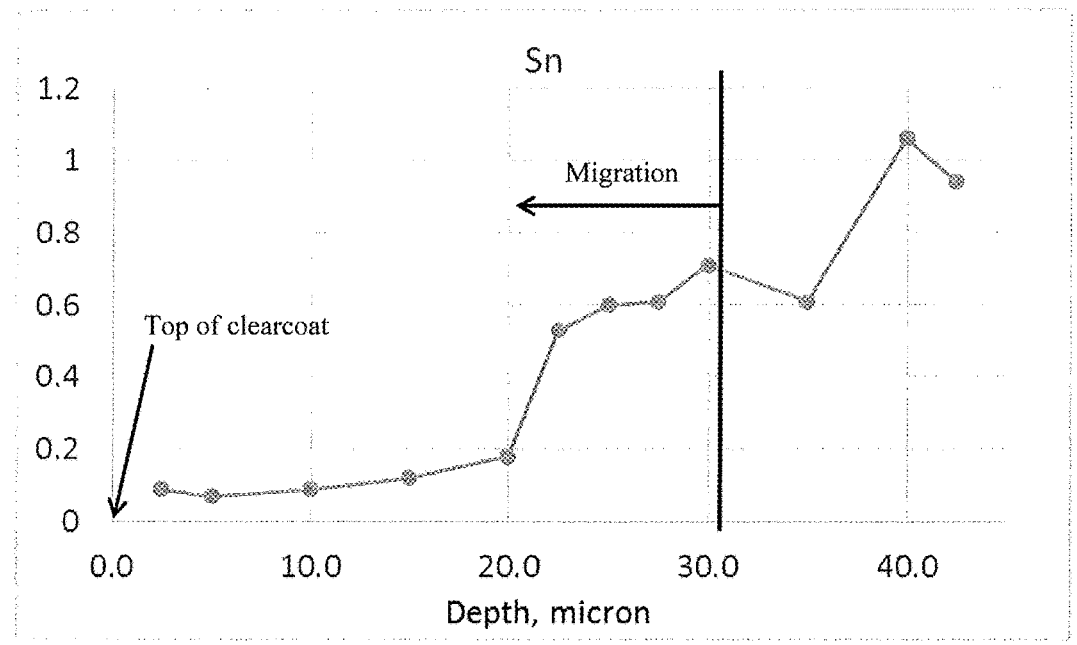
FIG. 5A shows a laser ablation and ex situ X-ray photoelectron spectroscopy (XPS) depth profile of Sn in a dual layer composite coating that includes a clearcoat and a basecoat, where the migration of an organo tin catalyst from the basecoat into the clearcoat is observed. The solid vertical line represents the interface between the clearcoat (left of line) and the basecoat (right of line).
Figure 5B:
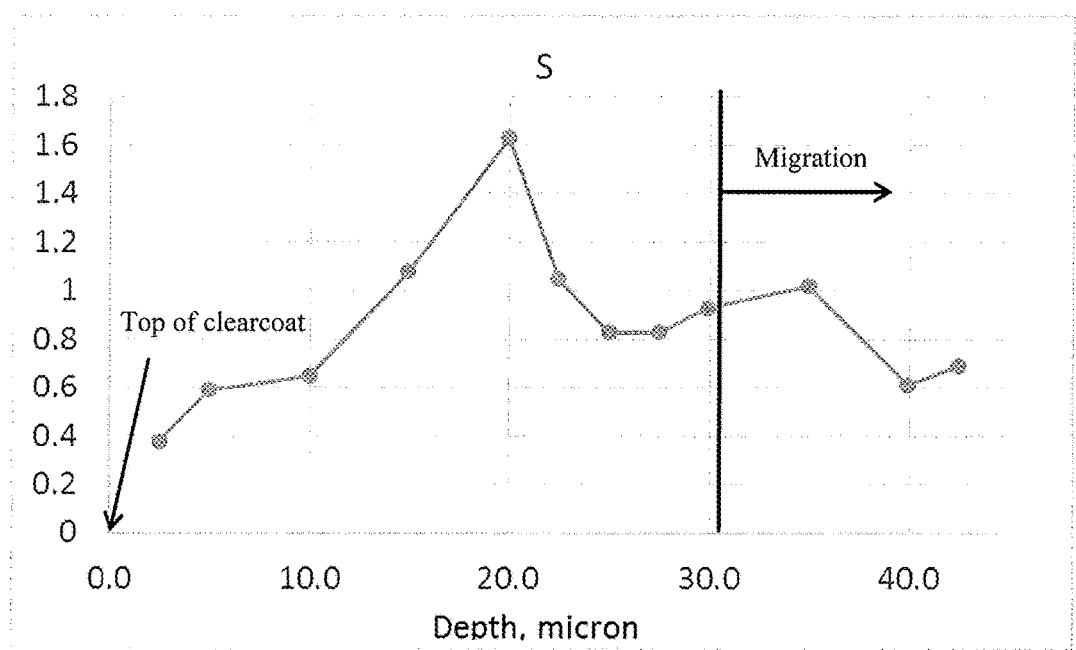
FIG. 5B shows a laser ablation and ex situ XPS depth profile of S in the dual layer composite coating of FIG. 5A, where the migration of an unblocked sulfonic acid catalyst from the clearcoat into basecoat is observed. The solid vertical line represents the interface between the clearcoat (left of line) and the basecoat (right of line).

The laser ablation with ex situ XPS results are shown in FIGS. 5A and 5B. FIG. 5A shows the migration of DBTDL from the basecoat into the topcoat based on the Sn-3d XPS signal through the dual layer composite coating to the Al substrate. According to FIG. 5A, the DBTBL catalyst migrates around 12.5 μm into the topcoat. Beyond 12.5 μm from the interface of the basecoat and the topcoat, the Sn-3d signal drops rapidly towards the surface of the topcoat.

In FIG. 5B, the migration of DDBSA from the topcoat into the basecoat is observed by monitoring the S-2p signal through the dual layer composite coating to the Al substrate. The DDBSA catalyst migrates around 15 to 20 μm into the basecoat. Beyond 15 to 20 μm from the interface of the basecoat and the topcoat, the S-2p signal drops gradually through the basecoat towards the Al substrate.

Example 2

A second low temperature cure composite coating was prepared by in the same manner as Example 1 except that the basecoat was pigmented by the addition of 410.9 grams of Cabot Black Pearls 1300.

A low temperature cure composite coating was prepared by: depositing the pigmented waterborne basecoat composition on an aluminum substrate; drying the basecoat for 10 minutes at 43.3° C.; and depositing, on the partially dried basecoat, the solventborne topcoat composition.

Figure 6:
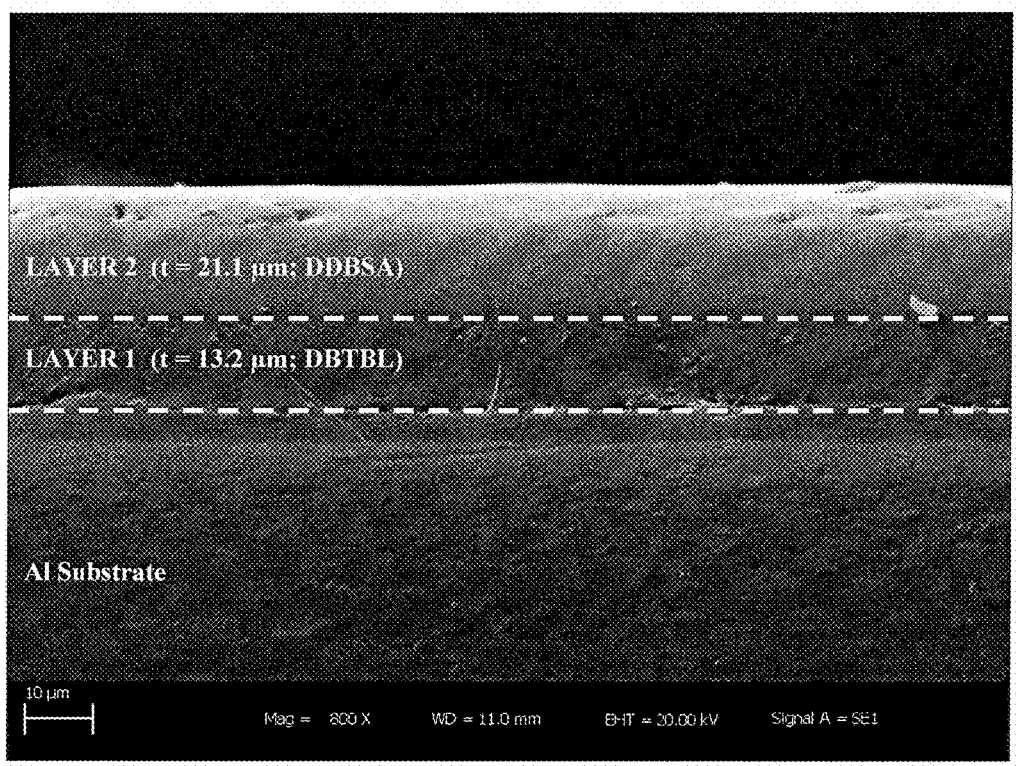
FIG. 6 shows a secondary electron micrograph of a dual layer composite coating obtained by curing the low temperature cure composite coating of Example 2.

The low temperature cure composite coating was cured at a temperature of 83.3° C. for 20 minutes, to provide a dual layer composite coating, including: a pigmented basecoat having a thickness of 13.2 µm and a urethane topcoat (clearcoat) having a thickness of 21.1 µm. A secondary electron micrograph of the dual layer composite coating on the aluminum substrate is shown in FIG. 6.

The dual layer composite coating was analyzed in the same manner as Example 1. The compositional results of the basecoat are shown in Table 3:

TABLE 3

| Element | Weight % | Atomic % |
|---|---|---|
| C K | 87.01 | 90.42 |
| N K | 3.13 | 2.79 |
| O K | 7.9 | 6.16 |
| Al K | 0.15 | 0.07 |
| Si K | 0.13 | 0.06 |
| S K | 1.12 | 0.44 |
| Sn L | 0.55 | 0.06 |
| Total | 100 | 100 |

The compositional results of the topcoat are shown in Table 4:

TABLE 4

| Element | Weight % | Atomic % |
|---|---|---|
| C K | 80.71 | 84.66 |
| N K | 6.64 | 5.97 |
| O K | 11.01 | 8.67 |
| Al K | 0.57 | 0.26 |
| Si K | 0.13 | 0.06 |
| S K | 0.95 | 0.37 |
| Total | 100 | 100 |

Importantly, the basecoat contains 1.12 percent by weight of sulfur and the topcoat contains 0.95 percent by weight of sulfur. Again, the compositional results confirm that the DDBSA that was originally only contained in the topcoat migrated into the basecoat. The atomic ratio of sulfur to carbon in the basecoat is 0.0049 and the atomic ratio of sulfur to carbon in the topcoat is 0.0044.

Although trace amounts of Sn were observed visually in the X-ray spectra of the basecoat, which originally contained the DBTDL, the content of Sn detected in the basecoat is technically below the detection limit at <0.1 atomic percent. No Sn was detected in the topcoat.

Due to the pigmentation, the dual layer composite coating of Example 2 was not suitable for depth profiling.

Obviously, numerous modifications and variations of the present invention are possible in light of the above teachings. It is therefore to be understood that within the scope of the appended claims, the invention may be practiced otherwise than as specifically described herein.

The invention claimed is:
1. A low temperature cure composite coating, comprising:
a substrate;
a first layer comprising a waterborne low temperature cure coating composition comprising
a first hydroxy-functional resin, which is a hydroxy-functional polyether-comprising polyurethane,
a first low temperature crosslinking agent, which is an aminoplast resin, and
a first catalyst, which is a metal catalyst, and
water; and
a second layer comprising a solventborne low temperature cure coating composition comprising
a second hydroxy-functional resin, which is a hydroxy-functional acrylic resin or a hydroxy-functional polyester resin;
a second low temperature crosslinking agent, which is an isocyanate resin that is optionally blocked,
a second catalyst, which is an acid catalyst, and
an organic solvent,
wherein the first layer and the second layer are adjacent to each other,
wherein the first catalyst catalyzes a crosslinking reaction between the second hydroxy-functional resin and the second low temperature crosslinking agent, and does not catalyze a crosslinking reaction between the first hydroxy-functional resin and the first low temperature crosslinking agent,
wherein the second catalyst catalyzes a crosslinking reaction between the first hydroxy-functional resin and the first low temperature crosslinking agent, and does not catalyze a crosslinking reaction between the second hydroxy-functional resin and the second low temperature crosslinking agent, and
wherein the solventborne and the waterborne low temperature cure coating compositions cure within 20 minutes at a temperature from 80-120° C.

2. The coating of claim 1, wherein the aminoplast resin is a condensation product of formaldehyde and melamine.

3. The coating of claim 1, wherein the aminoplast resin has formula (1):

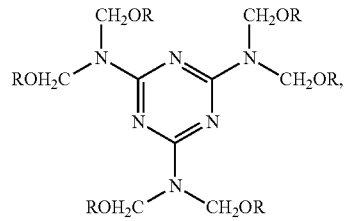

where each R is independently selected from H and $C_1$-$C_4$ alkyl groups, with the proviso that at least two R groups are different.

4. The coating of claim 1, wherein the metal catalyst is an organometallic bismuth, tin, lithium, or zirconium catalyst.

5. The coating of claim 1, wherein the metal catalyst is a dialkyl tin compound selected from the group consisting of dibutyltin oxide, dioctyl tin oxide, dibutyl tin dilaurate, dibutyl tin diacetate, dibutyl tin dimaleate, dibutyl tin distearate, dipropyl tin dioctoate, and dioctyl tin oxide.

6. The coating of claim 1, wherein the isocyanate resin comprises at least one diisocyanate selected from the groups consisting of trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4-diphenylene diisocyanate, 1,5-naphthylene diisocyanate, 1,4-naphthylene diisocyanate, 1-isocyanatomethyl-3-isocyanato-3,5,5-trimethylcyclohexane, 1,3-bis(1-isocyanato-1-methylethyl)benzene, bis(4-isocyanatocyclohexyl)methane, bis(4-isocyanatophenyl)methane, 4,4'-diisocyanatodiphenyl ether, and 2,3-bis(8-isocyanatooctyl)-4-octyl-5-hexylcyclohexane.

7. The coating of claim 6, wherein the diisocyanate is at least one selected from the group consisting of hexamethylene diisocyanate, 1-isocyanatomethyl-3-isocyanato-3,5,5-trimethylcyclohexane, and 1,3-bis(1-isocyanato-1-methylethyl)benzene.

8. The coating of claim 1, wherein the acid catalyst is an organic sulfonic acid selected from the group consisting of para-toluenesulfonic acid, methanesulfonic acid, dodecylbenzene sulfonic acid, dinonylnaphthalene disulfonic acid, and mixtures thereof.

9. The coating of claim 1, wherein the acid catalyst is a carboxylic acid selected from the group consisting of dimethylolpropionic acid, trimethylol acetic acid, dimethyl butyric acid, dimethyl pentanoic acid, butyric acid, hexanoic acid, heptanoic acid, octanoic acid, pelargonic acid, decanoic acid, 2-ethylhexanoic acid, lauric acid, and mixtures thereof.

10. The coating of claim 1, wherein the waterborne low temperature cure coating composition has a pot life of at least 30 days.

11. The coating of claim 1, wherein the solventborne low temperature cure coating composition does not comprise water.

12. The coating of claim 1, wherein the waterborne low temperature cure coating composition further comprises a pigment or colorant.

13. The coating of claim 1, wherein the substrate comprises at least one thermoplastic material selected from the group consisting of a polyolefin, a polyamide, a polyurethane, a polyester, a polycarbonate, an acrylonitrile-butadiene-styrene (ABS) copolymer, an EPDM rubber, an acrylic polymer, and a vinyl polymer.

14. The coating of claim 1, wherein the waterborne low temperature cure coating composition comprises, based on a total weight of resin solids in the composition:
    from 35 to 65 percent by weight of the first hydroxy-functional resin;
    from 15 to 65 percent by weight of the first low temperature crosslinking agent; and
    from 0.05 to 7.5 percent by weight of the first catalyst.

15. The coating of claim 14, wherein the waterborne low temperature cure coating composition further comprises the second catalyst, wherein the content of the second catalyst in the first low temperature cure coating composition is less than the content of the first catalyst.

16. The coating of claim 1, wherein the solventborne low temperature cure coating composition comprises, based on a total weight of resin solids in the composition:
    from 35 to 65 percent by weight of the second hydroxy-functional resin;
    from 35 to 65 percent by weight of the second low temperature crosslinking agent; and
    from 0.25 to 7.5 percent by weight of the second catalyst.

17. The coating of claim 16, wherein the solventborne low temperature cure coating composition further comprises the first catalyst, wherein the content of the first catalyst in the second low temperature cure coating composition is less than the content of the second catalyst.

18. A low temperature composite coating, obtained by curing the coating of claim 1 for 20 minutes or less at a temperature from 80 to 120° C.

19. A kit, comprising:
    a first one component, waterborne low temperature cure coating composition comprising
        a first hydroxy-functional resin, which is a hydroxy-functional polyether-comprising polyurethane;
        a first low temperature crosslinking agent, which is an aminoplast resin, and
        a first catalyst, which is a metal catalyst, and
        water; and
    a second two component, solventborne low temperature cure coating composition comprising
        a first component comprising a second hydroxy-functional resin, which is a hydroxy-functional acrylic resin or a hydroxy-functional polyester resin, and an organic solvent, and
        a second component comprising a second low temperature crosslinking agent, which is an isocyanate resin that is optionally blocked, and an organic solvent,
        wherein at least one of the first component and the second component further comprises a second catalyst, which is an acid catalyst,
    wherein the waterborne low temperature cure coating composition does not comprise a catalyst that catalyzes a reaction between the first hydroxy-functional resin and the first low temperature crosslinking agent, and the solventborne low temperature cure coating composition does not comprise a catalyst that catalyzes a reaction between the second hydroxy-functional resin and the second low temperature crosslinking agent.

* * * * *

UNITED STATES PATENT AND TRADEMARK OFFICE
CERTIFICATE OF CORRECTION

PATENT NO. : 10,113,085 B2  
APPLICATION NO. : 15/220081  
DATED : October 30, 2018  
INVENTOR(S) : Timothy December et al.

Page 1 of 1

It is certified that error appears in the above-identified patent and that said Letters Patent is hereby corrected as shown below:

In the Specification

Column 10, Line 16, "tartarate," should read -- tartrate, --;

Column 17, Line 5, should read

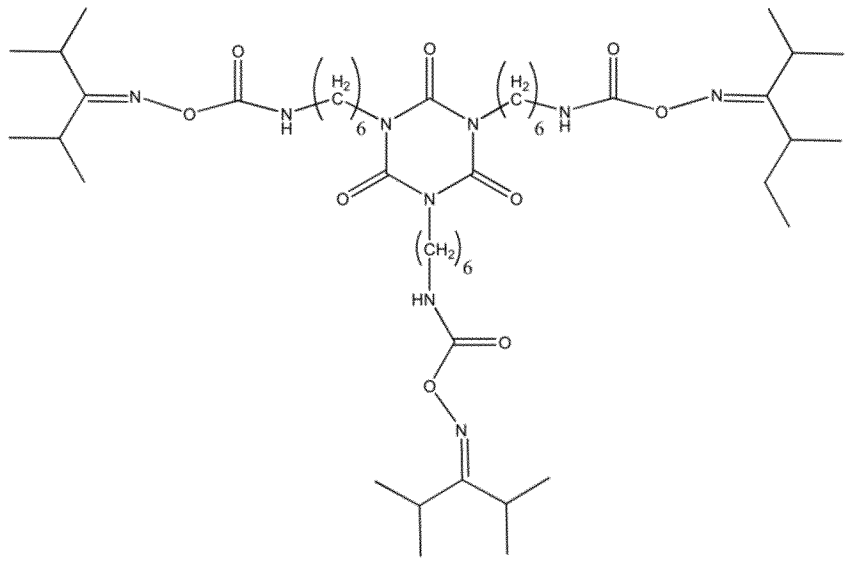

--  (VII), and --;

Column 19, Line 62, "naptha," should read -- naphtha --;

Column 23, Line 17, "naptha," should read -- naphtha --.

Signed and Sealed this  
Twenty-fourth Day of December, 2019

Andrei Iancu  
*Director of the United States Patent and Trademark Office*